United States Patent Office 3,185,676
Patented May 25, 1965

3,185,676
METHOD OF AZO DYE CHROMATION
Karl J. Klein, Slingerlands, N.Y., assignor to General
Aniline & Film Corporation, New York, N.Y., a corporation of Delaware
No Drawing. Filed Aug. 12, 1960, Ser. No. 49,127
4 Claims. (Cl. 260—145)

This invention relates to the chromation of azo dyes, and relates more particularly to an improved method of chroming o,o'-metallizable azo dyes.

In practice, chromations of this nature have previously been carried out employing a previously prepared mixture or complex of a chroming agent with a chelating agent wherein such mixture or complex has been in the approximate ratio of one gram-atom, i.e., one mole, of chromium to two moles of chelating agent.

I have now discovered that this same method of chromation employing a previously prepared mixture or complex of a chroming agent and a chelating agent is equally effective when the ratio of chelating agent to chroming agent is reduced to less than 2:1; i.e. the ratio of chelating agent to chroming agent may be preferably as low as 1:1, but in some cases can be even lower, i.e. about 0.5:1, especially if a longer time is employed.

I have furthermore discovered that it is not necessary to preform the chroming complex or to premix the chromium compound with the chelating agent prior to adding it to the dye solution, but that satisfactory chromation can be accomplished by adding the chromium compound and the chelating agent separately to the unchromed base.

In accordance with this invention many advantages are obtained. Thus, a separate mixing step for the preparation of the chromium complex or chromium-chelating agent mixture is eliminated. Moreover, less chelation agent is required since a ratio of as low as 0.5–1.0 mole chelation agent to 1 gram-atom, i.e., one mole, of chromium can be employed in contrast to the customarily employed 2 moles chelation agent to 1 gram-atom, i.e., one mole, of chromium.

Due to the elimination of the premixing step and the use of a reduced amount of chelating agent, there results a savings in material, labor and occupancy, yet the resulting chromed dye has equivalent wet fastness to a chromed dye produced employing a preformed chromium chelate or a mixture of a chromium compound and a chelating agent employing a 1:2 ratio of chromium to chelating agent.

The types of configurations which lend themselves to chromation are those customarily employed in the production of o,o'-metallized dyes, such as:

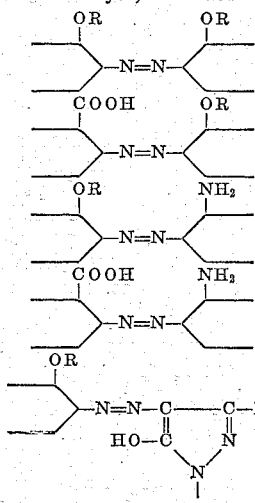

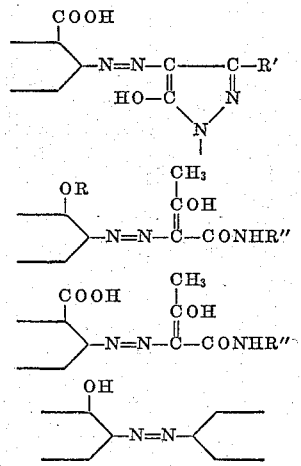

In the above configurations, R represents hydrogen and a lower alkyl group such as methyl or ethyl, R' represents lower alkyl and lower carbalkoxy, and R" represents an aryl radical.

The following list illustrates the types of amines which may be employed in the diazo moiety in the production of the o,o'-chromed dyes of this invention:

4- and 5-methyl-2-aminophenol
4- and 5-chloro-2-aminophenol
4- and 5-nitro-2-aminophenol
4- and 5-methylsulfonyl-2-aminophenol
4- and 5-butylsulfonyl-2-aminophenol
4- and 5-sulfamyl-2-aminophenol
4- and 5-N-methylsulfamyl-2-aminophenol
4- and 5-N-butylsulfamyl-2-aminophenol
4- and 5-N,N-dimethylsulfamyl-2-aminophenol
4-chloro-5-nitro-2-aminophenol
4-methyl-6-nitro-2-aminophenol
6-acetylamino-4-nitro-2-aminophenol
4-chloro-5-sulfamyl-2-aminophenol
Dianisidine
Anthranilic acid
1-amino-2-naphthol-4-sulfonic acid
6-aminophenol-2,4-disulfonic acid
2-amino-6-nitrophenol-4-sulfonic acid
6-amino-4-chlorophenol-2-sulfonic acid
2,4-dimethoxyaniline
4-benzamido-2,5-dimethoxyaniline
4-cyano-2,5-dimethoxyaniline The following list illustrates the types of coupling components which may be employed in the production of the o,o'-chromed dyes of this invention:

3,4-dimethylphenol
2-naphthol
8-acetylamino-2-naphthol
2,4-dihydroxyquinoline
Acetoacetanilide
3-methyl-1-phenyl-5-pyrazolone
3'-sulfamylacetoacetanilide
3-methyl-1-(m-sulfamylphenyl)-5-pyrazolone
3-methyl-1-(p-chlorophenyl)-5-pyrazolone
2-naphthylamine
6-sulfamyl-2-naphthylamine
6-methylsulfamyl-2-naphthylamine
6-methoxy-2-naphthylamine
8-amino-1-naphthol-3,6-disulfonic acid
8-amino-1-naphthol-3,6-disulfonamide
3-dimethylsulfamyl-1-naphthol
6-hydroxyindazole The chroming agent employed may be any water-soluble or dispersible non-chelated chromium compound.

such as a suspension of chromium hydroxide, sodium chromate, potassium chromate, ammonium chromate, chromium formate, chromium acetate, chromic ammonium sulfate, potassium chromium sulfate, chromium chloride, chromium sulfate and the like.

The chelating agent employed is preferably salicylic acid, but in practice may be any of the usual chelating agents of the polyhydroxy, hydroxycarboxy and adjacent dicarboxy type such as polyhydric alcohols, e.g. glycol, glycerine and diethyleneglycol; phenols, e.g. gallic acid; acids, e.g. tartaric acid, citric acid, cresotinic acid, oxalic acid and the like.

A method of carrying out this invention may comprise adding to a slightly acidic solution of dye of a pH of about 5.0 to 6.8 approximately 1 gram-atom, i.e., one mole, of chromium to 2 moles of dye and preferably about 1 mole of chelating agent. The addition of a higher ratio of chelating agent does not appreciably effect the wet fastness of the chromed dye, merely adding to the cost. However, up to 2 moles may be added which is the ratio presently used in the art. The dye may be chromed immediately on production of the dye, i.e. before isolation of the dye, or a solution or slurry of an isolated dye may be employed. The order of addition of the chroming agent and the chelating agent is immaterial; they may be added at the same time or one subsequently to the other in either order. Actual chromation is carried out by heating at temperatures of about 100 to 130° C. for 1 to 20 hours, after which the dye is precipitated, as by cooling and/or salting out, filtered, washed and dried in usual manner.

The following examples are illustrative and are not intended to be limitative.

*Example 1*

A. 20 grams of anthranilic acid, 100 cc. of water, 27.9 grams of hydrochloric acid 20° Bé. and 108 grams of ice are combined. To this mixture is added 10 grams of sodium nitrite as a 31.5% solution. Stirring is continued for 30 minutes care being taken that the temperature remains at about 0–5° C.

28 grams of 3-methyl-1-phenyl-5-pyrazolone, 130 cc. of water and 5.4 grams of sodium hydroxide solution (30%) are mixed, stirred for 30 minutes and then heated at 90° C. until a clear solution is formed. 50 grams of sodium acetate crystals are added and the solution iced to a temperature of about 10° C.

This solution of 3-methyl-1-phenyl-5-pyrazolone is then added, over a period of about 1 hour to the diazo solution, maintaining the temperature at about 5–10° C.

The volume is adjusted to 2000 cc. with water. The pH is about 5.8. To this solution is added 8.1 grams preformed sodium chromium salicylate as a 3.22% solution. The pH is adjusted to 6.3–6.5 employing glacial acetic acid. The charge is heated in an autoclave at 120–125° C. for 12 hours, then filtered, washed and dried. 55 grams of dye are obtained.

This method of chromation represents the customary method of commercial chromation employed in industry today, using the 2:1 ratio of salicylic acid to chromium.

B. The diazo is coupled as in A.

The volume is adjusted to 2000 cc. with water. The pH is about 6.0. To this solution are added 7.6 grams of chromium formate as a paste and 27.6 grams of salicyclic acid. The mixture is heated to 100° C. for 15–20 minutes, then treated with 11.6 grams of sodium hydroxide as a 40% solution. The charge is heated in an autoclave at 120–125° C. for 12 hours, then filtered, washed and dried. 55 grams of dye are obtained.

This method of chromation represents the method wherein the 2:1 ratio of salicyclic acid to chromium is employed, but wherein the preformed chelate or preformed mixture is not used.

C. The diazo is coupled as in A.

The volume is adjusted to 2000 cc. with water. The pH is about 6.0. To this is added 7.6 grams of chromium formate as a paste and 13.8 grams of salicylic acid. The mixture is heated to 100° C. for 15–20 minutes, then treated with 6.8 grams of sodium hydroxide as a 40% solution. The charge is heated in an autoclave at 120–125° C. for 12 hours, then filtered, washed and dried. 62 grams of dye are obtained.

This method of chromation embodies the use of an approximately 1:1 mole ratio of salicyclic acid and chromium, not premixed or prechelated, thus illustrating this invention.

D. The diazo is coupled as in A.

The volume is adjusted to 2000 cc. with water. The pH is about 5.8. To this is added 7.6 grams of chromium formate as a paste. The mixture is heated to 100° C. for 15–20 minutes, then treated with 5.0 grams of sodium hydroxide as a 40% solution. The charge is heated in an autoclave at 120–125° C. for 12 hours, then filtered, washed and dried. 71.5 grams of dye are obtained. This method of chromation represents a control wherein no chelating agent is present.

E. The above dyes are dispersed as follows: 12.6 grams of dry dye, 4.8 grams of Polyfon H (commercially available ligninsulfonic acid dispersing agent) 2.4 grams of dextrin, 0.24 gram of soda ash and a few cubic centimeters of water are mixed and viscous milled 1½ hours and air dried.

In dyeing wool, on the basis of 1 gram of wool, a dyebath is made up consisting of 1% of dye, 2% of ammonium sulfate and 40 cc. of water. 1 gram of wool, to which are tied acetate, cotton and rayon skeins, is dyed in this bath for 1 hour at the boil, rinsed and dried.

There is very little difference in the strengths or the staining properties of A, B and C. However, D stained considerably more than A, B and C. A, B and C were about on a par when compared employing AATCC wash test No. 3, AATCC fulling test No. 3, AATCC acid perspiration test and AATCC alkaline perspiration test. D was considerably inferior in all cases.

These tests demonstrate that while my improved method of chromation is not superior technically to the art methods, it is on a par with them and technologically my new method is superior since both an operational step and material are saved.

*Example 2*

54.5 grams of 2-aminophenol-4-sulfonamide, 300 cc. of water, 51.0 grams of hydrochloric acid 20° Bé. and 180 grams of ice are combined. To this mixture is added 20 grams of sodium nitrite as a 31.5% solution. Stirring is continued for 30 minutes at a temperature between 10 and 15° C.

55 grams of 3-methyl-1-phenyl-5-pyrazolone, 450 cc. of water and 45 grams of ammonium hydroxide solution 26° Bé. are stirred to solution. Ice is added to reduce the temperature to 10–15° C.

The diazo is added to the 4-methyl-1-phenyl-5-pyrazolone solution and stirring continued for 1 hour. The dye is filtered, washed and dried.

Chromations were carried out following the steps:

A. Into a beaker add 700 cc. of water and 242 grams of dye made into a paste with water. Add 12 grams of sodium chromium salicylate. Adjust the pH to 6.3–6.5. Add 15 cc. glacial acetic acid. Heat 112–115° C. for 3 hours. pH after chromation is 4.4. The product is filtered and washed at 20–22° C. Dry weight is 103 grams.

B. Into a beaker add 700 cc. of water and 242 grams of dye made into a paste with water. Add 12 grams of chromium formate as an 11.7% paste and 43.6 grams of salicylic acid. Heat to 90° C. for 5 minutes. Adjust the pH to 6.3–6.5. Add 16 grams of sodium hydroxide as a 40% by volume solution. Heat 112–115° C. for 3 hours. pH after chromation is 4.1. The product is filtered and washed at 20–22° C. Dry weight is 110 grams.

C. Into a beaker add 700 cc. of water and 242 grams of dye made into a paste with water. Add 12 grams of chromium formate as an 11.7% paste and 21.89 grams of salicylic acid. Heat to 90° C. for 5 minutes. Adjust pH to 6.3–6.5. Add 10 grams of sodium hydroxide as a 40% by volume solution. Heat 112–115° C. for 3 hours. pH after chromation is 4.1. The product is filtered and washed at 20–22° C. Dry weight is 102 grams.

Dyeings were made as in Example 1, with the exception that the dye was not dispersed before dyeing.

As in Example 1, the dyes showed approximately the same strengths, and while there was a small difference in the staining of the various acetate, cotton and rayon which were attached during dyeing, the difference was sufficiently small as to be almost negligible.

In carrying out AATCC wash test No. 3, staining on cotton and wool was somewhat less and therefore better in the case of 2C.

*Example 3*

36.7 grams of 2-amino-4-chloro-5-nitrophenol is dissolved in 300 cc. of water and 10 grams of sodium hydroxide (30% by weight solution). 13.4 grams of sodium nitrite are added as a 38.5% solution and diazotization effected by adding slowly to the mixture 54 cc. of hydrochloric acid (36.5% HCl), 340 grams of ice and 350 cc. of water.

After stirring for 30 minutes the diazo solution is added to a solution of 47 grams of 1-naphthol-3-sulfonamide dissolved in 8.1 grams of sodium hydroxide and 900 cc. of water to which was added 90 grams of sodium carbonate and 57 grams of sodium bicarbonate. The charge is stirred two hours to completion of the reaction.

To the charge is then added 17 grams of sodium hydroxide, 29 grams of salicylic acid and 8 grams (as $Cr_2O_3$) of chromium formate. The charge is heated to 95° C. and held at that temperature for 45 minutes to complete the reaction.

After cooling to 90° C., 19 grams of sodium hydroxide and 47 grams of sodium sulfide flakes are added in order to reduce the nitro group. Reduction is complete in 20 minutes.

72 grams of sodium bicarbonate are added, the charge cooled and filtered, yielding 180 grams of dry material.

The dye is dispersed as in Example 1E. Wool and nylon dyeings made in the manner of Example 1E are a blue shade which is very fast to light.

While this example does not employ preformed chrome salicylate the ratio of salicylic acid to chromium is the usual, i.e. 2 mols salicylic acid to 1 mol chromium.

*Example 4*

Four separate samples of unmetallized dye are produced as follows:

To 100 cc. of water is added 15.7 grams of 2-aminophenol-4-dimethylsulfonamide and 15.4 cc. of hydrochloric acid (36.5% HCl) and the charge stirred to solution. After clarification with Nuchar it is iced to 6–10° C. 5 grams of sodium nitrite as a 38.5% solution is added and the charge stirred ½ hour at 10–15° C.

The coupler solution is prepared by adding 16 grams of N-(7-hydroxy-1-naphthyl) acetamide, 90 grams of ammonium hydroxide 26° Bé. and 33 grams of sodium hydroxide (30% by weight solution). The solution is stirred to solution and iced to 0° C.

The diazo solution is added to the coupler during the period of an hour at a temperature maintained at 0–2° C., and then stirred well until completion of the coupling.

It will be noted in the following samples that preformed chrome salicylate is employed in 4A, but not in 4B, 4C and 4D, and that varying ratios of chrome to salicylic acid are employed.

A. To one of the samples of dye solution is added 3.3 grams of preformed sodium chromium salicylate solution (on the basis of $Cr_2O_3$). The pH is adjusted to 6.6–7.4 with about 5 cc. of hydrochloric acid. It is heated to 101–102° C. for 2 hours while maintaining the pH at 6.6–7.4. The charge is cooled, the volume brought to 1900 cc., the pH adjusted to 0.8–1.3 with about 70 cc. of hydrochloric acid and filtered. A wool dyeing of this dye vs. a standard, dyed in the manner of Example 1E is 35/100 vs. the standard and the dyeing is somewhat brighter and bluer. This represents 110 grams of SS material (sales standard).

This represents the usual commercial method of metallization employing preformed chromium-salicylic acid complex in a 1:2 ratio.

B. To a second sample of dye solution is added 3.3 grams of chromium formate (on the basis of $Cr_2O_3$) and 12 grams of salicylic acid. The pH is adjusted to 6.6–7.4 employing about 12.5 cc. of sodium hydroxide solution. Metallization is continued as in 4A. A wool dyeing of this dye vs. a standard dye, dyed in the manner of Example 1E is 32/100 vs. the standard and the dyeing is somewhat brighter and bluer. This represents 120 grams of SS material.

This represents the use of chromium-salicylic acid in a 1:2 ratio, but not as a preformed complex.

C. A third sample of dye solution is treated as in 4B with the exception that the 12 grams of salicylic acid is replaced by 9 grams of salicylic acid. A wool dyeing of this dye vs. a standard dye, dyed in the manner of Example 1E is 35:100 and the dyeing is somewhat brighter and bluer. This represents 117 grams of SS material.

This represents the use of chromium-salicylic acid in a 1:1.5 ratio, and not as a preformed complex.

D. The fourth sample of dye solution is treated as in 4B with the exception that the 12 grams of salicylic acid is replaced by 6 grams of salicylic acid. A wool dyeing of this dye vs. a standard dye, dyed in the manner of Example 1E is 41/100 and the dyeing is somewhat brighter and bluer. This represents 112 grams of SS material.

This represents the use of chromium-salicylic acid in a 1:1 ratio, and not as a preformed complex.

In the above it is reasonable to assume that the differences in yields based on comparative dyeings vs. a standard are within the limits of experimental differences and that the yields of dyes are approximately the same.

These examples demonstrate that while my improved method of chromation appears to be only slightly superior technically to the art methods, technologically it is superior since both an operation step and material are saved.

It is to be understood that the foregoing detailed description is given merely by way of illustration and that many variations may be made therein without departing from the spirit of this invention.

What is claimed is:

1. Method of chroming o,o'-metallizable azo dyes which are free of sulfonic acid groups, which comprises, (A) separately adding to an aqueous solution of an o,o'-metallizable dye having a pH in the range of about 5 to 6.8 (1) an amount of a chroming agent consisting of a water-dispersible, non-chelated trivalent chromium-containing compound, corresponding to provide a mole ratio of dye to chromium of about 2 in the resulting dye-chroming agent mixture, and (2) a chelating agent selected from the group consisting of polyhydroxy, hydroxycarboxy, and dicarboxy-chelating agents, said chelating agent being added in an amount corresponding to provide a mole ratio of chelating agent to chromium in the range of from about 0.5:1 to 1:1 in the final dye-chroming agent-chelating agent mixture, and (B) heating the mixture at a temperature of about 100 to 130° C. for about 1 to 20 hours to provide a chromed dye.

2. Method according to claim 1 wherein the chromium is in the form of a suspension of a chroming agent selected from the group consisting of chromium hydroxide, sodium chromate, potassium chromate, ammonium chromate, chromium formate, chromium acetate, chromic ammonium sulfate, chromium ammonium sulfate, chromium chloride and chromium sulfate.

3. Method according to claim 1 wherein the chromium is the form of chromium formate and the chelating agent is salicylic acid.

4. The method according to claim 1 wherein said chelating agent is salicylic acid.

References Cited in the file of this patent
UNITED STATES PATENTS

| 2,417,735 | Conzetti et al. | Mar. 18, 1947 |
| 2,428,866 | Conzetti et al. | Oct. 14, 1947 |
| 2,775,581 | Neier et al. | Dec. 25, 1956 |

FOREIGN PATENTS

| 745,374 | Germany | July 29, 1944 |